United States Patent
Ajitomi et al.

(10) Patent No.: US 7,633,959 B2
(45) Date of Patent: Dec. 15, 2009

(54) BRIDGING DEVICE, COMMUNICATION PROGRAM, AND COMMUNICATION METHOD

(75) Inventors: Daisuke Ajitomi, Yokohama (JP);
Yasuhiro Morioka, Yokohama (JP);
Keiichi Teramoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 783 days.

(21) Appl. No.: 11/249,275

(22) Filed: Oct. 14, 2005

(65) Prior Publication Data
US 2006/0092956 A1    May 4, 2006

(30) Foreign Application Priority Data
Oct. 28, 2004   (JP)   ............... 2004-314256

(51) Int. Cl.
*H04L 12/28* (2006.01)
(52) U.S. Cl. .................... 370/402; 370/252; 370/401
(58) Field of Classification Search ............ None
See application file for complete search history.

(56) References Cited

U.S. PATENT DOCUMENTS 5,018,137 A * 5/1991 Backes et al. ............... 370/401

2004/0001440 A1 * 1/2004 Kostoff et al. ............... 370/235

FOREIGN PATENT DOCUMENTS

| JP | 2003-8610 | 1/2003 |
| JP | 2003-244192 | 8/2003 |

* cited by examiner

*Primary Examiner*—Duc C Ho
(74) *Attorney, Agent, or Firm*—Oblon, Spivak, McClelland, Maier & Neustadt, L.L.P.

(57) ABSTRACT

There is provided with a bridging device that is connected to a first and a second network, including: a connection detecting unit that detects an appliance on the second network; a state holding unit that holds either a first or a second state; an arbitration unit that determines that the detected appliance is subjected to bridging processing in a case where the second state is held by the state holding unit, and, determines whether the detected appliance is subjected to the bridging processing on the basis of a predetermined confirmation condition where the first state is held by the state holding unit and, in a case where it is determined that the appliance is subjected to the bridging processing, sets the state holding unit in the second state; and a bridging unit that subjects the appliance, which is determined to be subjected to the bridging processing, to the bridging processing.

13 Claims, 6 Drawing Sheets

BRIDGING DEVICE, COMMUNICATION PROGRAM, AND COMMUNICATION METHOD

CROSS-REFERENCE TO RELATED APPLICATIONS

This application claims the benefit of priority under 35USC §119 to Japanese Patent Application No. 2004-314256 filed on Oct. 28, 2004, the entire contents of which are incorporated herein by reference.

BACKGROUND OF THE INVENTION

1. Field of the Invention

The present invention relates to a bridging device, a communication program, and a communication method, and, in particular, to a technique for preventing, for example, when there are plural bridging devices connected to a first network and a second network, an appliance belonging to the second network from being bridged redundantly by the plural bridging devices.

2. Related Art

In recent years, with the spread of personal computers, networking in homes has been developing rapidly. In response to this trend, not only personal computers but also white goods, such as air conditions, refrigerators, and washing machines, and AV appliances are given a network connection function to connect to the Internet and access other appliances. Consequently, users are provided with new functions. It is necessary to make a control protocol for transmission and reception via a network medium common to such white goods in order to allow the white goods to connect with one another.

At present, examples of such a control protocol include UPnP (Universal Plug and Play) using a TCP/IP network established on an IEEE (Institute of Electrical and Electronics) 802 network, AV/C used on an IEEE1394 high-speed serial bus, and ECHONET® usable on various communication networks.

The UPnP is an international standard protocol mainly having an object of connecting a personal computer, peripheral equipment of the personal computer, and network appliances such as a router with one another. At present, appliances to be connected according to the protocol are expanded to the AV appliances to advance standardization of the protocol.

An IEEE1394 high-speed bus network is a network for connecting the AV appliances. The AV/C used on the network is a standard for a protocol for transmitting and receiving control commands for the AV appliances.

The ECHONET is a Japanese standard of a control protocol for controlling white goods such as, air conditioners, refrigerators, and washing machines, sensors, and installations. It is assumed that the ECHONET is used on various communication networks such as an IEEE802 network, a Bluetooth® network, an infrared ray network, a lighting line network, and a low-power radio network.

The UPnP, the AV/C, and the ECHONET are incompatible independent protocol standards. Communication networks usable by the UPnP, the AV/C, and the ECHONET are different except that both the UPnP and the ECHONET operate on the IEEE802 network. Therefore, an appliance conforming to a certain control protocol cannot control an appliance conforming to another protocol. For example, a personal computer conforming to the UPnP cannot control an air conditioner conforming to the ECHONET and a video recorder conforming to the AV/C.

A bridging device solves this problem and allows an appliance conforming to a certain protocol to control an appliance conforming to another protocol. The bridging device intervenes in networks used by both the protocols and converts one protocol into the other protocol. In this case, when one protocol has a retrieval mechanism and a publication mechanism for appliance information and function information held by the appliance, there is a problem of how various kinds of information of the appliance belonging to the other protocol should be shown to the former protocol. Various solutions for the problem have been proposed. For example, there is a technique for making it possible to operate an IEEE1394 appliance with the UPnP protocol by converting an IEEE1394 packet and an AV/C command used on an IEEE1394 network into a Simple Object Access Protocol (SOAP) message of the UPnP. Examples of the technique include a technique disclosed in Japanese Patent Laid-Open No. 2003-8610. Japanese Patent Laid-Open No. 2003-8610 proposes a solution concerning a problem of how a function held by an IEEE1394 appliance is expressed as an UPnP appliance. Basically, the IEEE1394 appliance is virtually shown as an UPnP appliance (hereinafter referred to as a virtual UPnP device) on a bridging device.

However, Japanese Patent Laid-Open No. 2003-8610 does not refer to a problem that is caused when there are plural bridging devices. Specifically, a bridging device, which shows an appliance conforming to the AV/C protocol on the IEEE1394 network to the IEEE802 network as a virtual UPnP device, is called an IEEE1394 bridging device. When there are plural IEEE1394 bridging devices and operate independently, one IEEE1394 appliance is made public as a virtual UPnP device on the plural IEEE1394 bridging devices. As a result, from the IEEE802 network, it looks as if there are plural IEEE1394 appliances.

SUMMARY OF THE INVENTION

According to an aspect of the present invention, there is provided with A bridging device that is connected to a first network and a second network and realizes communication between an appliance connected to the first network and an appliance connected to the second network, the bridging device comprising: a connection detecting unit that detects an appliance on the second network; a state holding unit that holds either a first state or a second state; an arbitration unit that when an appliance on the second network is detected, determines that the detected appliance is subjected to bridging processing in a case where the second state is held by the state holding unit, and when an appliance on the second network is detected, determines whether the detected appliance is subjected to the bridging processing on the basis of a predetermined confirmation condition where the first state is held by the state holding unit and, in a case where it is determined that the appliance is subjected to the bridging processing, sets the state holding unit in the second state; and a bridging unit that subjects the appliance, which is determined to be subjected to the bridging processing, to the bridging processing.

According to an aspect of the present invention, there is provided with a communication program that induces a bridging device which is connected to a first network and a second network and realizes communication between an appliance connected to the first network and an appliance connected to the second network, to execute: detecting an appliance on the second network; detecting whether the bridging device is in a first state or a second state; determining that the detected appliance is subjected to bridging processing in a case where the bridging device is in the second state; determining whether the detected appliance is subjected to the bridging processing on a basis of a predetermined confirmation condition in a case where the bridging device is in the first state, and setting the bridging device in the second state in a case where it is determined that the detected appliance is subjected to the bridging processing; and subjecting the appliance, which is determined to be subjected to the bridging processing, to the bridging processing.

According to an aspect of the present invention, there is provided with a communication method executed in a bridging device that is connected to a first network and a second network and realizes communication between an appliance connected to the first network and an appliance connected to the second network, the communication method comprising: detecting an appliance on the second network; detecting whether the bridging device is in a first state or a second state; determining that the detected appliance is subjected to bridging processing in a case where the bridging device is in the second state; determining whether the detected appliance is subjected to the bridging processing on a basis of a predetermined confirmation condition in a case where the bridging device is in the first state, and setting the bridging device in the second state in a case where it is determined that the detected appliance is subjected to the bridging processing; and subjecting the appliance, which is determined to be subjected to the bridging processing, to the bridging processing.

DETAILED DESCRIPTION OF THE INVENTION

Figure 1:
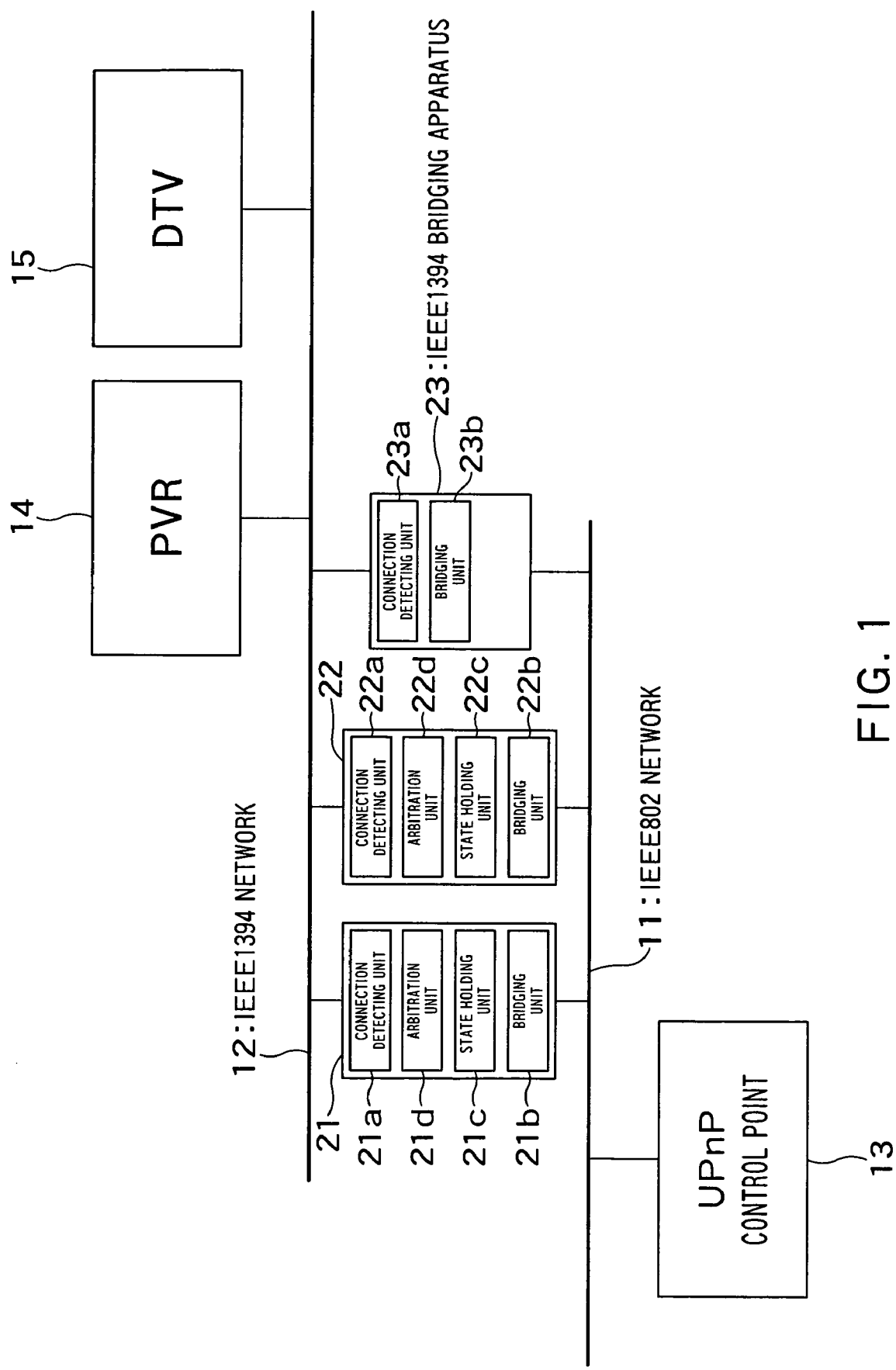
FIG. 1 is a block diagram showing an overall constitution of a network to which an IEEE1394 bridging device according to an embodiment of the invention is applied.

In order to solve the problems of the conventional techniques, the inventors proposed a method described below before devising the invention. The proposal was applied for patent with the Japan Patent Office as Japanese Patent Application No. 2004-244120 earlier than a priority date of this application. Japanese Patent Application No. 2004-244120 was not laid open as of the priority date. In order to facilitate understanding of embodiments of the invention, the method will be hereinafter explained.

In this method, when an IEEE1394 appliance is shown to an IEEE802 network as a virtual UPnP device in an IEEE1394 bridging device, first, generation rules for an identifier (UDN: Unique Device Name) of the virtual UPnP device are defined and made common among IEEE1394 bridging devices. When the IEEE1394 bridging device generates a virtual UPnP device corresponding to a certain IEEE1394 appliance, the IEEE1394 bridging device checks whether the IEEE1394 appliance is already present as the virtual UPnP device on the IEEE802 network. Processing for the confirmation is realized by transmitting a discover packet of a Simple Service Discovery Protocol (SSDP) using the UDN. When the IEEE1394 appliance is already present, the IEEE1394 bridging device does not perform bridging processing for the IEEE1394 appliance. On the other hand, when the IEEE1394 appliance is not present, the IEEE1394 bridging device performs bridging processing and makes the IEEE1394 appliance public on the IEEE802 network as a virtual UPnP device (this processing is hereinafter simply referred to as arbitration processing). The procedure described above makes it possible to solve the problems of the conventional techniques.

In the generation rules for an UDN, a device identifier (an EUI64 value) of the IEEE1394 appliance and a device identifier (an EUI64 value, a MAC address, etc.) of the IEEE1394 bridging device, which can be used permanently, are used. For example, when an identifier of the IEEE1394 bridging device is 00036EAC37A1 and an EUI value of the IEEE1394 appliance is 4552-EF0302AF10, a UDN given to a virtual UPnP device of the IEEE1394 appliance is set as 00036EAC37A1-4552-EF0302AF10 or the like. The other IEEE1394 bridging devices can check presence of the virtual UPnP device corresponding to the IEEE1394 appliance on the IEEE1394 bridging device by receiving of SSDP alive packet from the virtual UPnP device or transmitting of an SSDP discovery packet.

As described above, the IEEE1394 bridging device in the method has a method of solving the problem of redundancy of a virtual UPnP device that occurs when there are plural bridging devices. However, the method includes three problems described below.

(1) When bus reset occurs on the IEEE1394 network and connection of a new IEEE1394 appliance is confirmed, the IEEE1394 bridging device always executes the arbitration processing. However, in the arbitration processing, the IEEE1394 bridging device needs to transmit an SSDP discovery packet and wait for a response from peripheral equipment for a fixed time. Thus, the processing requires a fixed time regardless of whether there are the other IEEE1394 bridging devices around the IEEE1394 bridging device. In other words, a fixed delay always occurs until the IEEE1394 appliance is made operable according to the UPnP protocol. This is the same when there is only one IEEE1394 bridging device in an identical IEEE802 network. Thus, this is inefficient.

(2) The method does not take into account measures to be taken when an IEEE1394 bridging device not having an arbitration processing mechanism is present. The patent application, which has not been laid open, is on the premise that plural IEEE1394 bridging device include same arbitration processing mechanisms, respectively, and have same UDN generation rules. Therefore, it is impossible to avoid the problem of redundancy of a virtual UPnP device when there is an IEEE1394 bridging device that does not have the arbitration processing mechanism and the UDN generation rule.

(3) The patent application, which has not been laid open, does not describe measures to be taken when an IEEE1394 bridging device generating a virtual UPnP device of a certain IEEE1394 appliance is disconnected from the IEEE802 network or the IEEE1394 network because a power supply is cut off or a network cable comes off. Therefore, the IEEE1394 appliance made public on the IEEE802 network side by the disconnected IEEE1394 bridging device cannot be seen from the IEEE802 network even if other bridging devices are present.

Embodiments of the invention solve the problems (1) to (3) inherent in the method in addition to the problems of the conventional techniques.

The Embodiments of the invention will be hereinafter explained in detail with reference to the accompanying drawings.

FIG. 1 is a block diagram showing an overall constitution of a network to which an IEEE1394 bridging device according to an embodiment of the invention is applied.

In the constitution, an UPnP control point 13 is present on an IEEE802 network 11. A Personal Video Recorder (PVR) 14 and a Digital Television (DTV) 15 associated with an AV/C command are connected to an IEEE1394 network 12. Two IEEE1394 bridging devices 21 and 22 are connected between the IEEE802 network 11 and the IEEE1394 network 12. An IEEE1394 bridging device 23, which has UDN generation rule for a virtual UPnP device identical with those of the IEEE1394 bridging devices 21 and 22 but does not have an arbitration unit and a state holding unit, is also connected between the IEEE802 network 11 and the IEEE1394 network 12.

Connection detecting units 21a, 22a, and 23a in the IEEE1394 bridging devices 21, 22, and 23 detect appliances on the IEEE1394 network 12 and the IEEE802 network 11 and detect disconnection of appliances from the IEEE1394 network 12 and the IEEE802 network 11. For example, the connection detecting units 21a, 22a, and 23a recognize an appliance connected to the IEEE1394 network 12 on the basis of bus reset in the IEEE1394 network 12. In the IEEE1394 network, bus reset occurs according to connection or disconnection of an appliance. The connection detecting units 21a, 22a, and 23a detect the bus reset. The connection detecting units 21a, 22a, and 23a have a function for detecting an appliance on the IEEE1394 network 12, a function for detecting an appliance on the IEEE802 network 11, a function for detecting disconnection of an appliance from the IEEE1394 network 12, and a function for detecting disconnection of an appliance from the IEEE802 network 11. These functions may be realized by providing a unit for performing each of the functions or units for performing arbitrary combinations of the functions.

Bridging units 21b, 22b, and 23b in the IEEE1394 bridging devices 21, 22, and 23 perform bridging processing for an IEEE1394 appliance on the IEEE1394 network 12. The bridging units 21b and 22b among the bridging units 21b, 22b, and 23b perform bridging processing only when the bridging units 21b and 22b receive a bridging instruction from arbitration units 21d and 22d. The bridging unit 23b among the bridging units 21b, 22b, and 23b subjects the IEEE1394 appliance on the IEEE1394 network 12 to bridging processing unconditionally. Basically, the bridging processing virtually shows the IEEE1394 appliance as a UPnP appliance (hereinafter referred to as virtual UPnP device) on the IEEE1394 bridging device. As a specific method of the bridging processing, for example, the technique described in Japanese Patent Laid-Open No. 2003-8610 can be used.

Figure 2:
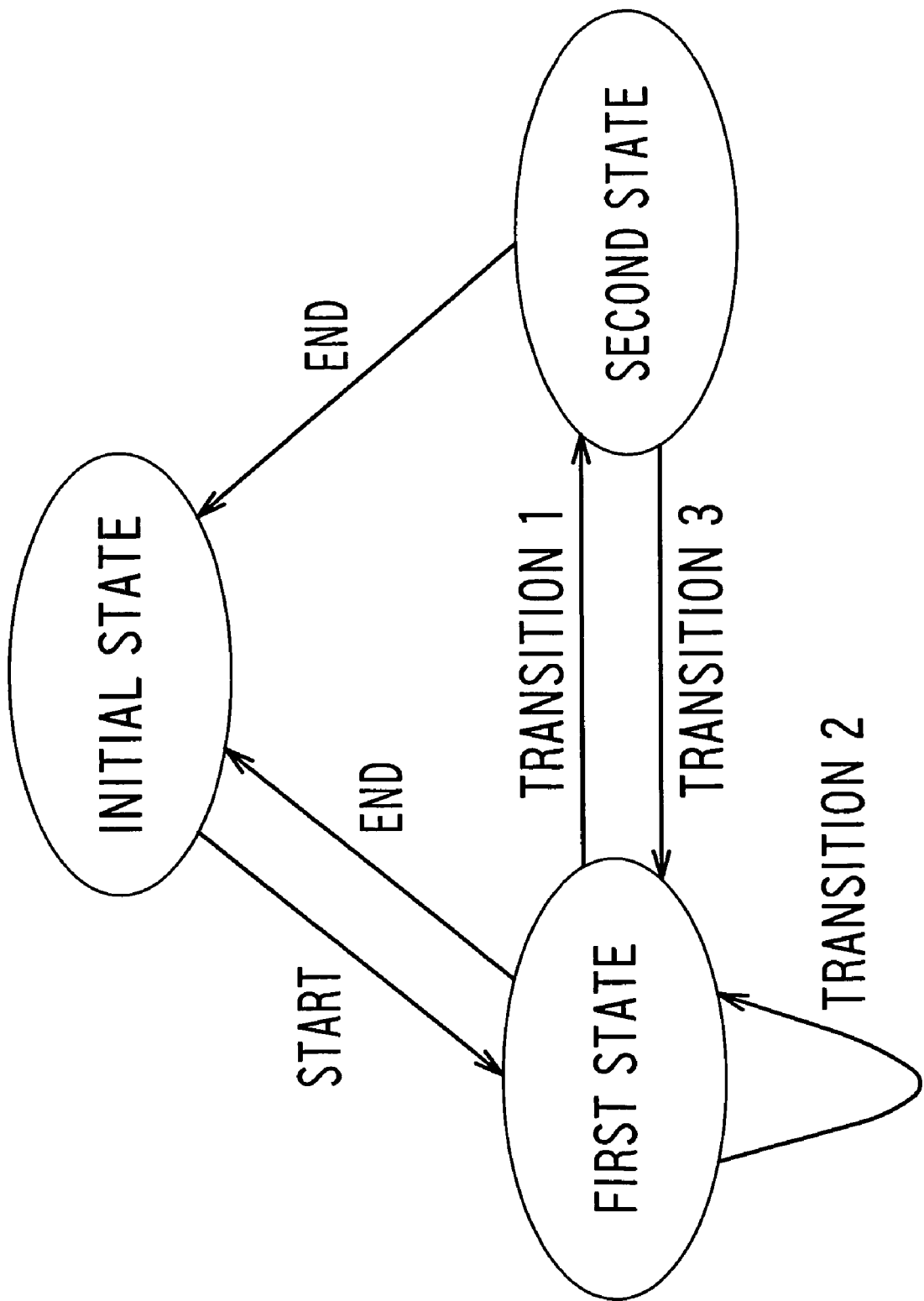
FIG. 2 is a state transition diagram in the IEEE1394 bridging device.

State holding units 21c and 22c hold any one of an initial state, a first state, and a second state, respectively. FIG. 2 is a state transition diagram of the IEEE1394 bridging devices 21 and 22. The state holding units 21c and 22c hold the initial state when a power supply is OFF and hold either the first state or the second state when the power supply is ON. The IEEE1394 bridging devices 21 and 22 are capable of transitioning between the first state and the second state.

When an IEEE1394 appliance is connected to the IEEE1394 network 12, an IEEE1394 bridging device in the second state subjects the IEEE1394 appliance to bridging processing unconditionally. When an IEEE1394 appliance is connected to the IEEE1394 network 12, an IEEE1394 bridging device in the first state judges, every time the connection is performed, whether the IEEE1394 appliance should be subjected to bridging processing. When the IEEE1394 appliance is subjected to the bridging processing, the IEEE1394 bridging device transitions to the second state and performs the bridging processing.

Specifically, in the case in which the second state is held by the state holding units 21c and 22c, when an IEEE1394 appliance is connected to the IEEE1394 network 12, the arbitration units 21d and 22d determine that the IEEE1394 appliance is unconditionally subjected to bridging processing and instruct the bridging unit 21b and 22b to perform the bridging processing. In the case in which the second state is held by the state holding units 21c and 22c, when an IEEE1394 bridging device not having an arbitration unit is connected to the IEEE1394 network 12, the arbitration units 21d and 22d set the state holding units 21c and 22c in the first state and cause the bridging units 21b and 22b to stop the bridging processing.

On the other hand, in the case in which the first state is held by the state holding units 21c and 22c, when an IEEE1394 appliance is connected to the IEEE1394 network 12, the arbitration units 21d and 22d judge, using a method described later, whether the IEEE1394 appliance should be subjected to bridging processing. When it is determined that the bridging processing is performed, the arbitration units 21d and 22d set the state holding units 21c and 22c in the second state, determine that the IEEE1394 appliance is subjected to the bridging processing, and instruct the bridging units 21b and 22b to perform the bridging processing. In the case in which the first state is held by the state holding units 21c and 22c, when another IEEE1394 bridging device performing bridging processing is disconnected from the IEEE1394 network 12, the arbitration units 21d and 22d judge, using a method described later, whether the IEEE1394 bridging device should take over the bridging processing. When it is determined that the IEEE1394 bridging device takes over the bridging processing, the arbitration units 21d and 22d set the state holding units 21c and 22c in the second state and instruct the bridging units 21b and 22b to execute the bridging processing.

Figure 3:
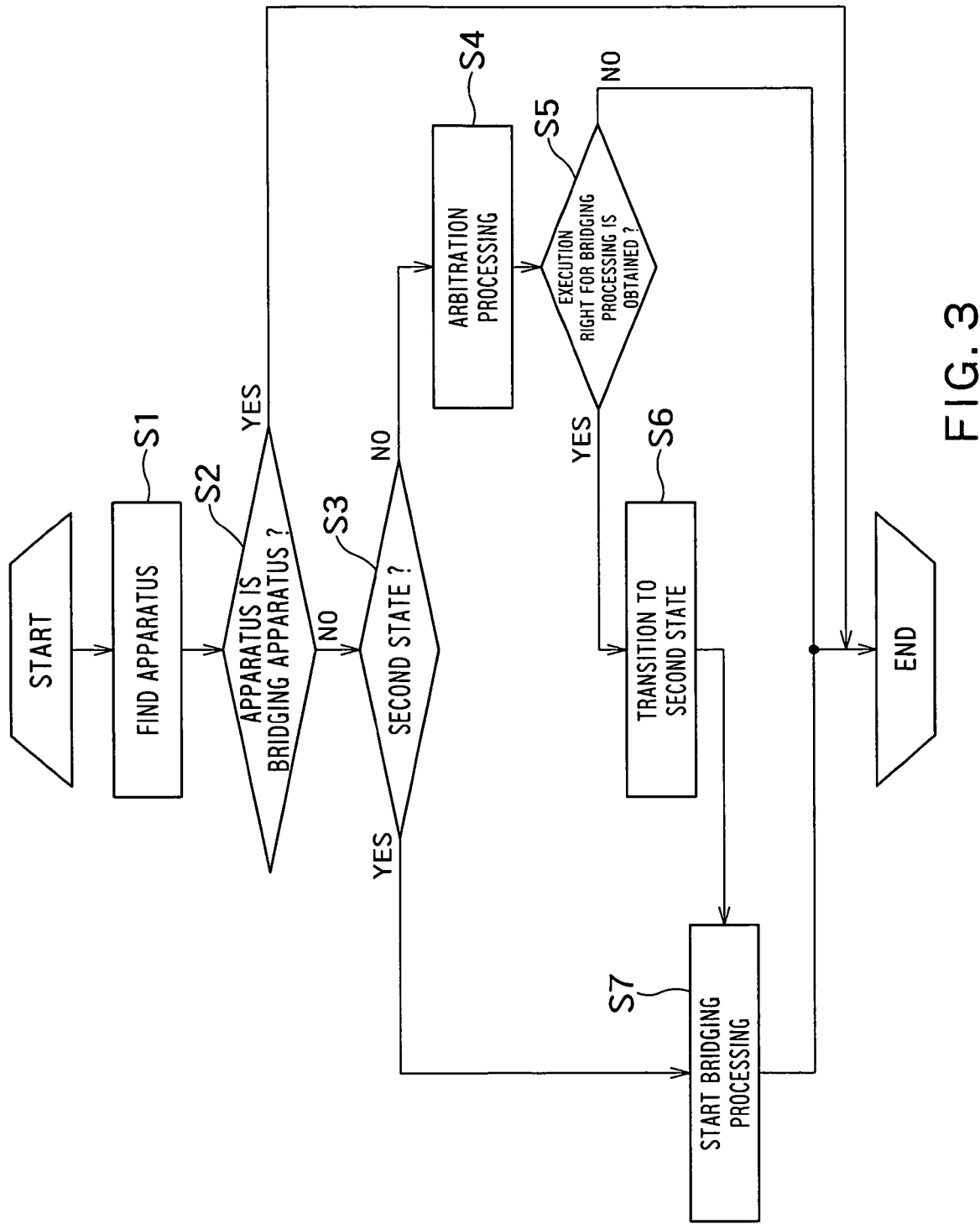
FIG. 3 is a flowchart for explaining an operation of the IEEE1394 bridging device.
Figure 4:
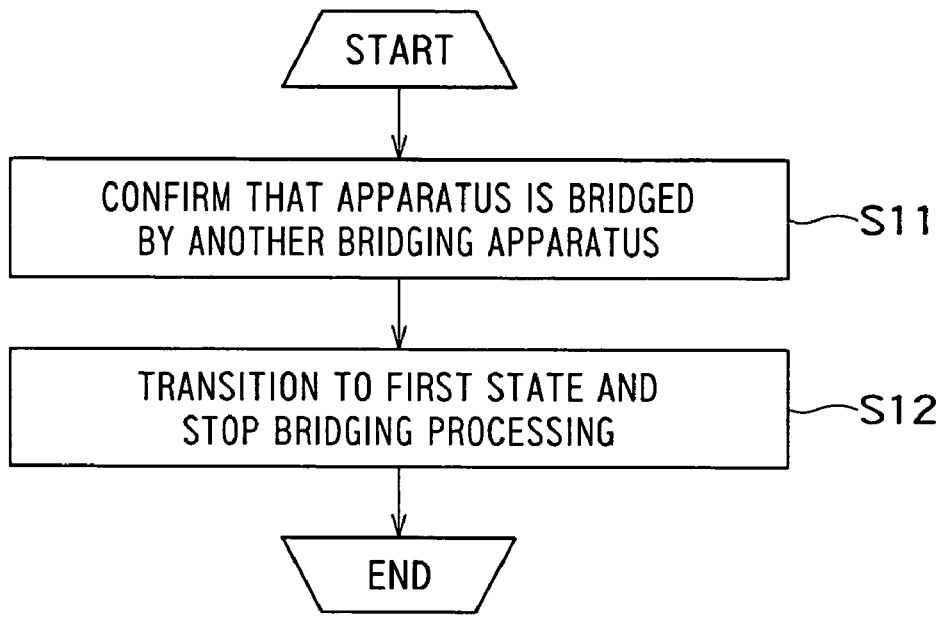
FIG. 4 is a flowchart for explaining an operation of the IEEE1394 bridging device.
Figure 5:
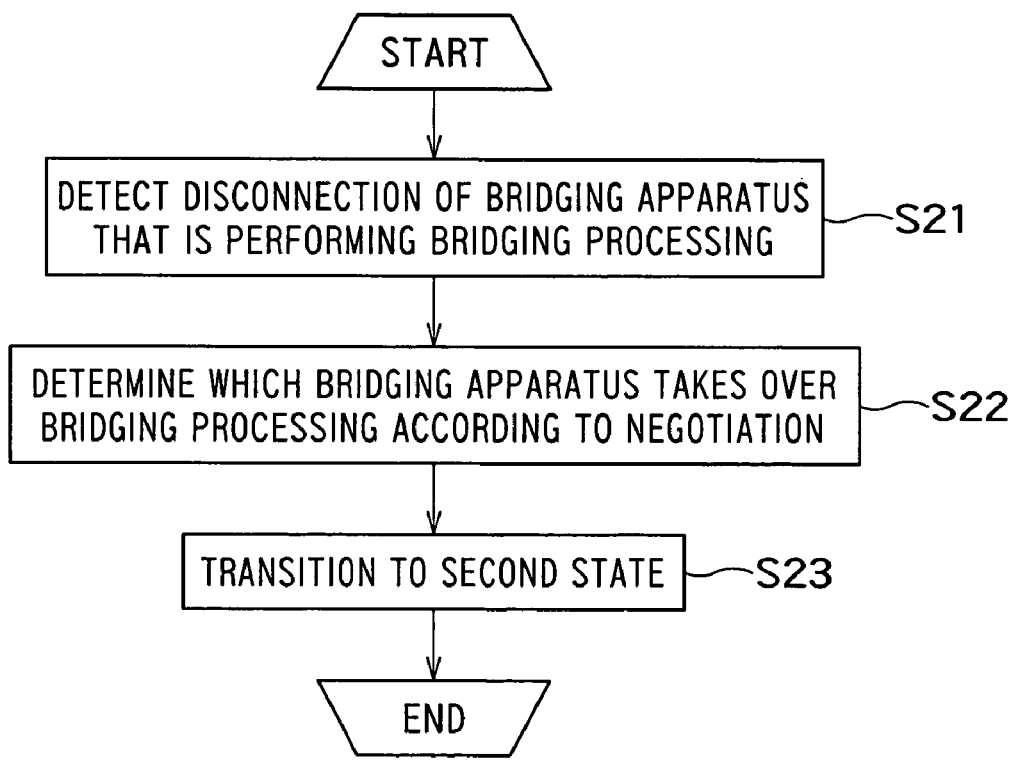
FIG. 5 is a flowchart for explaining an operation of the IEEE1394 bridging device.

FIGS. 3 to 5 are flowcharts for explaining operations of the IEEE1394 bridging device in detail. The IEEE1394 bridging device will be explained more in detail with reference to FIG. 1 and FIGS. 3 to 5.

It is assumed that one IEEE1394 bridging device 21 is connected and no appliance other than the IEEE1394 bridging device 21 is connected to the IEEE1394 network 12 in FIG. 1. A state of the IEEE1394 bridging device 21 is the first state. When a PVR 14 is connected to the IEEE1394 network 12, bus reset occurs in the IEEE1394 network 12. The connection detecting unit 21a in the IEEE1394 bridging device 21 detects the bus reset and recognizes that the PVR 14 is connected to the IEEE1394 network 12 anew (step S1 and NO in step S2 in FIG. 3). Since the IEEE1394 bridging device 21 is in the first state (NO in step S3), the arbitration unit 21d in the IEEE1394 bridging device 21 checks, by transmitting a discovery packet of a Simple Service Discovery Protocol (SSDP), whether the PVR 14 is already operable according to the UPnP protocol from the inside of the IEEE802 network 12, that is, whether the PVR 14 has already been subjected to bridging processing (step S4). The SSDP discovery packet may be transmitted with a Unique Device Name (UDN) given to the PVR 14 designated. If a deviceType of the PVR 14 is made clear in advance, the discovery packet may be transmitted with the deviceType designated. As a result of the check, the arbitration unit 21*d* recognizes that another IEEE1394 bridging device is not present on the IEEE802 network 11 and the PVR 14 is still inoperable according to the UPnP protocol from the IEEE802 network 11 (YES in step S5) and transitions the state holding unit 21*c* to the second state (step S6). The arbitration unit 21*d* instructs the bridging unit 21*b* to perform bridging processing. The bridging unit 21*b* starts bridging processing for the PVR 14 (step S7).

Subsequently, the IEEE1394 bridging device 22 is connected to both the IEEE802 network 11 and the IEEE1394 network 12. The IEEE1394 bridging device 22 is in the first state. Bus rest occurs in the IEEE1394 network 12. The connection detecting unit 21*a* in the IEEE1394 bridging device 21 recognizes that a type of the connected appliance is an IEEE1394 bridging device (step S1 and YES in step S2). Therefore, bridging processing for the appliance is not performed. On the other hand, the connection detecting unit 22*a* in the IEEE1394 bridging device 22 recognizes that the PVR 14 and the IEEE1394 bridging device 21 are connected to the IEEE1394 network 12 (step S1). The arbitration unit 22*d* in the IEEE1394 bridging device 22 determines that bridging processing for the IEEE1394 bridging device 21 is not performed (YES in step S2). On the other hand, in order to judge whether bridging processing for the PVR 14 should be performed, the arbitration unit 22*d* starts arbitration processing (NO in step S2, NO in step S3, and S4). As a result of this arbitration processing, the arbitration unit 22*d* recognizes that the bridging processing for the PVR 14 has already been performed by the IEEE1394 bridging device 21. Therefore, the arbitration unit 22*d* determines that the bridging processing is not performed (NO in step S5). At this point, a state of the IEEE1394 bridging device 22 remains in the first state and a state of the IEEE1394 bridging device 21 remains in the second state.

Subsequently, a DTV 15 is connected to the IEEE1394 network 12. Bus reset occurs in the IEEE1394 network 12. The connection detecting unit 21*a* in the IEEE1394 bridging device 21 and the connection detecting unit 22*a* in the IEEE1394 bridging device 22 recognize that the DTV 15 is connected to the IEEE1394 network 12 anew (step S1 and NO in step S2). Since the IEEE1394 bridging device 21 is in the second state (YES in step S3), the arbitration unit 21 determines that bridging processing for the DTV 15 is performed and instructs the bridging unit 21*b* to start the bridging processing for the DTV 15 (step 57). On the other hand, since the IEEE1394 bridging device 22 is in the first state (NO in step S3), the arbitration unit 22*d* performs arbitration processing (step S4). As a result of this processing, the arbitration unit 22*d* confirms that the DTV 15 is operable from the IEEE802 network 11 and determines that the bridging processing for the DTV 15 is not performed (NO in step S5). At this point, again, the IEEE1394 bridging device 22 is in the first state and the IEEE1394 bridging device 21 is in the second state.

The IEEE1394 bridging device 23 is connected to both the IEEE802 network 11 and the IEEE1394 network 12. The IEEE1394 bridging device 23 does not have an arbitration unit. Thus, when the connection detecting unit 23*a* detects, in response to bus reset in the IEEE1394 network 12, that the PVR 14 and the DTV 15 are connected, the IEEE1394 bridging device 23 starts bridging processing for the PVR 14 and the DTV 15 unconditionally using the bridging unit 23*b*. At this point, the connection detecting unit 21*a* in the IEEE1394 bridging device 21 recognizes, by, for example, receiving an SSDP alive packet, that the IEEE1394 bridging device 23 has started the bridging processing for the PVR 14 and the DTV 15 (step S11 in FIG. 4). In other words, the connection detecting unit 21*a* recognizes that an IEEE1394 bridging device not having an arbitration unit is present. Thus, the arbitration unit 21*d* in the IEEE1394 bridging device 21 sets the state holding unit 21*c* in the first state and causes the bridging unit 21*b* to stop the bridging processing (step S12). The IEEE1394 bridging device 22 is in the first state.

Subsequently, the IEEE1394 bridging device 23 is disconnected from both the IEEE802 network 11 and the IEEE1394 network 12. Since an SSDP byebye packet is received on the IEEE802 network or an SSDP alive packet is not delivered within a fixed time, the connection detecting unit 21*a* in the IEEE1394 bridging device 21 and the connection detecting unit 22*a* in the IEEE1394 bridging device 22 understand that the IEEE1394 bridging device 23, which is performing bridging processing, has been disconnected (step S21 in FIG. 5). The arbitration unit 21*d* in the IEEE1394 bridging device 21 and the arbitration unit 22*d* in the IEEE1394 bridging device 22 execute arbitration processing immediately and perform negotiation to determine, according to comparison of UDN values thereof, which of the IEEE1394 bridging devices 21 and 22 takes over the bridging processing (step S22). As a result, when it is determined that the IEEE1394 bridging device 22 takes over the bridging processing (e.g., the arbitration unit having a larger UDN value is given a priority), the arbitration unit 22*d* in the IEEE1394 bridging device 22 transitions the state holding unit 22*c* to the second state and the bridging unit 22*b* starts bridging processing for the PVR 14 and the DTV 15 (step S23). A state of the IEEE1394 bridging device 21 remains in the first state.

Figure 6:
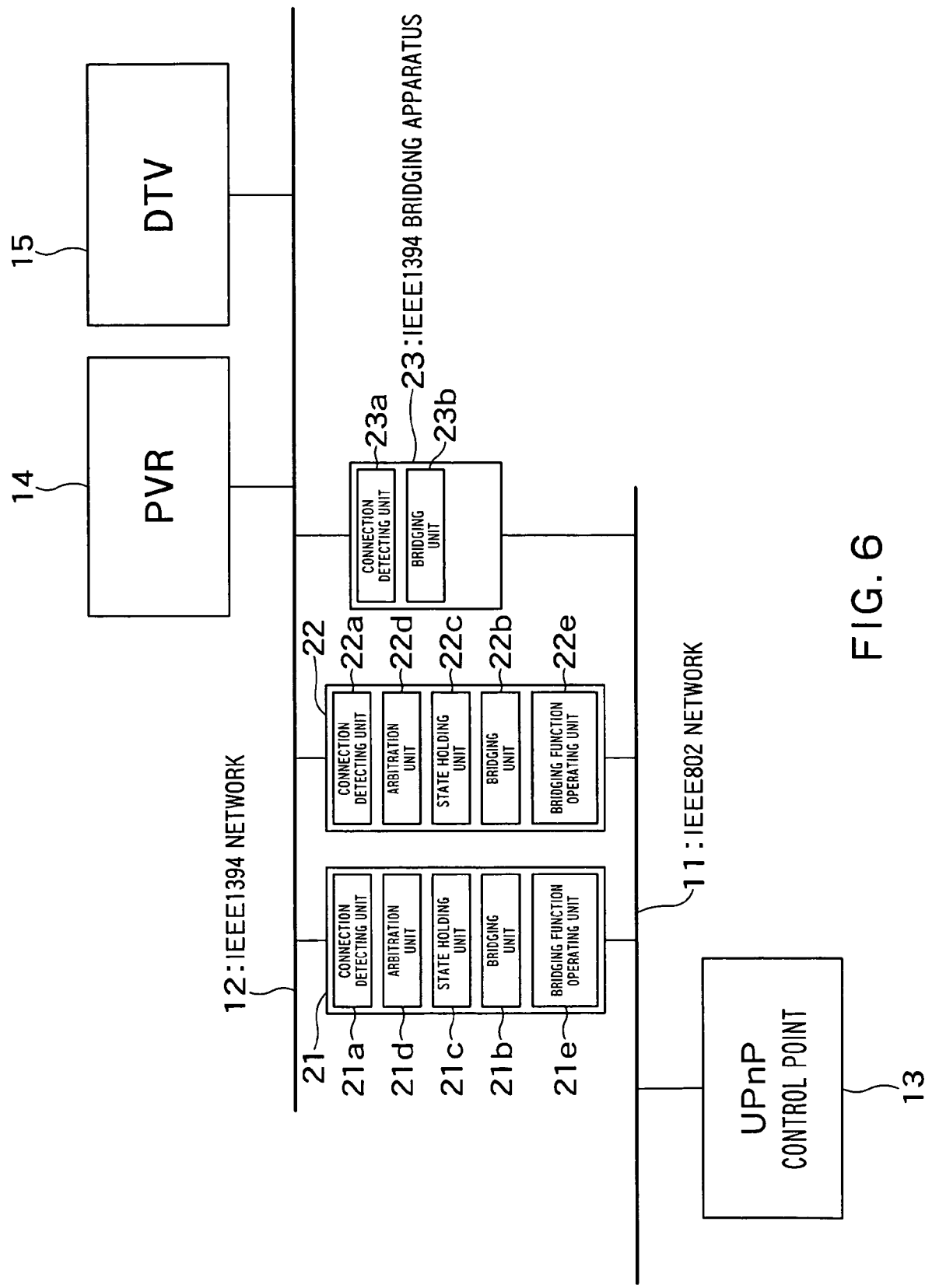
FIG. 6 is a block diagram showing a structure in which a bridge function operating unit is added to the IEEE1394 bridging device in FIG. 1.

Incidentally, as shown in FIG. 6, bridging function operating units 21*e* and 22*e*, which control bridging processing in the IEEE1394 bridging device 21 and the IEEE1394 bridging device 22 in response to an UPnP action from the outside, may be provided in the IEEE1394 bridging device 21 and the IEEE1394 bridging device 22 to make it possible to operate bridging processing from the outside. For example, the UPnP control point 13 on the IEEE802 network can cause the IEEE1394 bridging device 21 to perform bridging processing for the DTV 15 and cause the IEEE1394 bridging device 22 to perform bridging processing for the PVR 14. In other words, load distribution and the like for bridging processing becomes possible.

It is also possible to avoid redundancy of bridging processing by providing the bridge function operating unit. When the IEEE1394 bridging device 23 is an appliance having UDN generation rules (or deviceType) different from those of the IEEE1394 bridging devices 21 and 22, the IEEE1394 bridging devices 21 and 22 cannot even understand that the IEEE1394 bridging device 23 is executing bridging processing. Thus, bridging processing of the IEEE1394 bridging devices 21 and 22 is stopped by executing an operating action for the bridging processing from the UPnP control point 13. This makes it possible to avoid redundancy of the bridging processing.

With reference to FIG. 2 used in the previous explanation, case in which state transition occurs in an IEEE1394 bridging device are summarized as described below.

Transition 1: Cases in which the transition (from the first state to the second state) occurs are listed below.

(1-1) The IEEE1394 bridging device detects connection of an appliance to the IEEE1394 network 12 and confirms that no IEEE1394 bridging device is present in the IEEE802 network 11.

(1-2) After the IEEE1394 bridging device detects connection of an appliance to the IEEE1394 network 12 and confirms that another IEEE1394 bridging device is present in the IEEE802 network 11, it is determined through arbitration processing that the IEEE1394 bridging device itself performs bridging processing for the detected appliance.

(1-3) The IEEE1394 bridging device detects disconnection of an IEEE1394 bridging device, which has been performing bridging processing, and confirms that another IEEE1394 bridging device is not present in the IEEE802 network 11.

(1-4) After the IEEE1394 bridging device detects disconnection of an IEEE1394 bridging device, which has been performing bridging processing, and confirms that another IEEE1394 bridging device is present in the IEEE802 network 11, it is determined through arbitration processing that the IEEE1394 bridging device itself takes over bridging processing carried out by the disconnected IEEE1394 bridging device.

Transition 2: Cases in which the transition (the IEEE1394 bridging device remains in the first state) occurs are listed below.

(2-1) The IEEE1394 bridging device detects connection of an appliance to the IEEE1394 network 12 and confirms that the appliance connected to the IEEE1394 network 12 is operable from the inside of the IEEE802 network 11.

(2-2) The IEEE1394 bridging device detects connection of an appliance to the IEEE1394 network 12 and cannot confirm that the appliance connected to the IEEE1394 network 12 is operable from the inside of the IEEE802 network 11. As a result of arbitration processing between the IEEE1394 bridging device and another IEEE1394 bridging device on the IEEE802 network 11, the IEEE1394 bridging device confirms that the IEEE1394 bridging device itself does not execute bridging processing.

(2-3) After the IEEE1394 bridging device detects disconnection of an IEEE1394 bridging device, which has been performing bridging processing, and confirms that another IEEE1394 bridging device is present in the IEEE802 network 11, it is determined that the IEEE1394 bridging device itself does not take over the bridging processing carried out by the disconnected IEEE1394 bridging device.

Transition 3: A case in which the transition occurs is as described below.

It is confirmed that an appliance on the IEEE1394 network 12, for which the IEEE1394 bridging device itself is performing bridging processing, is also bridged from another IEEE1394 bridging device on the IEEE802 network 11.

As described above, according to this embodiment, even if an IEEE1394 bridging device not having an arbitration unit is present, the UPnP control point 13 on the IEEE802 network 11 can avoid to the utmost a situation in which the PVR 14 and the DTV 15 on the IEEE1394 network 12 become operable redundantly through the UPnP protocol. Moreover, even if an IEEE1394 bridging device, which is performing bridging processing, is disconnected from a network, the UPnP control point 13 can continue to operate the PVR 14 and the DTV 15 according to the UPnP protocol even after the disconnection by taking over of the bridging processing.

Figure 7:
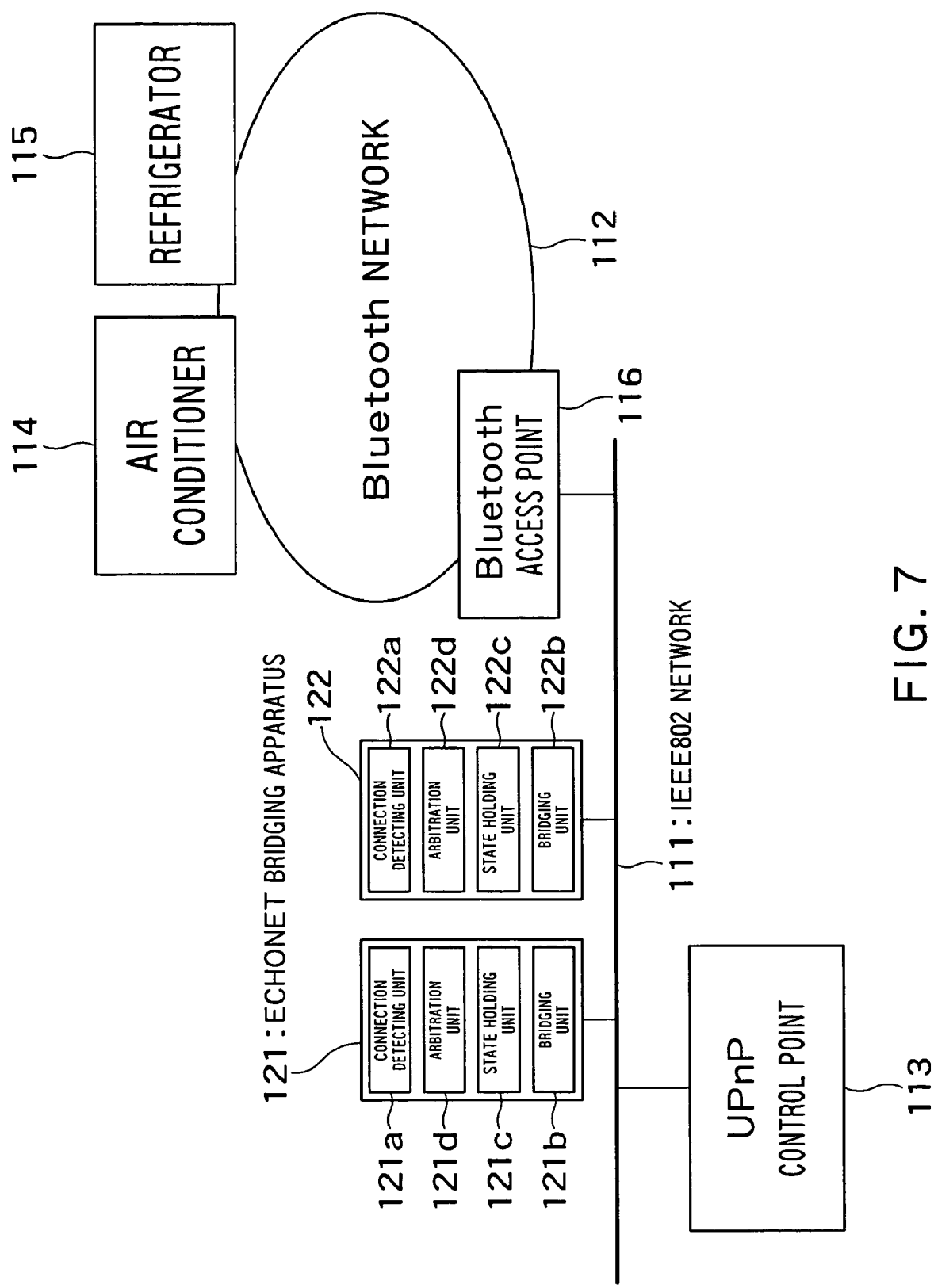
FIG. 7 is a block diagram showing an overall constitution of a network to which an IEEE1394 bridging device according to another embodiment of the invention is applied.

FIG. 7 is a block diagram showing an overall constitution of a network to which an ECHONET® bridging device according to another embodiment of the invention is applied.

In this constitution, a UPnP control point 113 is present on an IEEE802 network 111. An air conditioner 114 and a refrigerator 115 associated with the ECHONET protocol are connected to a Bluetooth® network 112. A Bluetooth access point 116 is connected to both the IEEE802 network 111 and the Bluetooth network 112. Moreover, two ECHONET bridging devices 121 and 122 associated with the invention, are connected to the IEEE802 network 111. The ECHONET bridging devices 121 and 122 include connection detecting units 121*a* and 121*d*, bridging units 121*b* and 122*b*, state holding units 121*c* and 122*c*, and arbitration units 121*d* and 122*d*, respectively. A mechanism of the ECHONET bridging devices 121 and 122 for detecting connection and disconnection of an ECHONET appliance on the Bluetooth network 112 is different from that of the IEEE1394 bridging device. However, the ECHONET bridging devices 121 and 122 are identical with the IEEE1394 bridging device otherwise. Thus, it is also possible to make an ECHONET appliance operable according to the UPnP protocol by providing an ECHONET bridging device associated with the invention.

Effects of the embodiments of the invention explained above are described as follows.

When bus reset occurs on an IEEE1394 network and connection of a new IEEE1394 appliance is recognized, the IEEE1394 bridging device according to the prior application of the applicant always executes arbitration processing. This means that a fixed time is required for processing regardless of whether there is another IEEE1394 bridging device in an identical subnet. This is inefficient. On the other hand, in this embodiment, when the IEEE1394 bridging device transitions to the first state, arbitration processing is not executed. Thus, it is possible to realize a reduction in loads and delays related to the arbitration processing.

An IEEE1394 bridging device associated with the invention, can coexist with an IEEE1394 bridging device, which has UDN generation rules (deviceType) for a virtual UPnP device in common with the IEEE1394 bridging device but does not have an arbitration unit, in an identical subnet. It is possible to regard that the IEEE1394 bridging device not having an arbitration unit performs an operation equivalent to that of an IEEE1394 bridging device having an arbitration unit in the second state. Thus, it is possible to avoid the problem of redundancy by transitioning the IEEE1394 bridging device associated with the invention, to the first state.

An IEEE1394 bridging device, to which the invention is applied, can coexist with an IEEE1394 bridging device, which has UDN generation rules (deviceType) for a virtual UPnP device different from those of the IEEE1394 bridging device and does not have an arbitration unit, in an identical subnet. In this case, it is likely that the problem of redundancy occurs. However, by providing the IEEE1394 bridging device with a function that can operate start and end of bridging processing according to the UPnP protocol, a user can expressly or an appliance can automatically avoid the problem of redundancy of a virtual UPnP device as much as possible.

Even when an IEEE1394 bridging device generating a virtual UPnP device of an IEEE1394 appliance is disconnected from an IEEE802 network or an IEEE1394 network because a power supply is cut off or a network cable comes off, if another IEEE1394 bridging device is present, it is possible to continue to operate the IEEE1394 appliance according to the UPnP protocol by automatically taking over bridging processing.

As described above, it is also possible to apply the embodiment of the invention to an ECHONET bridging device that makes an ECHONET appliance operable according to the UPnP protocol. The effects explained above also apply to the ECHONET bridging device directly.

What is claimed is:

1. A bridging device that is connected to a first network and a second network and realizes communication between an appliance connected to the first network and an appliance connected to the second network, the bridging device comprising:
   a connection detecting unit that detects an appliance on the second network;
   a state holding unit that holds either a first state or a second state;
   an arbitration unit that
      when an appliance on the second network is detected, determines that the detected appliance is subjected to bridging processing when the second state is held by the state holding unit, and
      when an appliance on the second network is detected, determines whether the detected appliance is subjected to the bridging processing on the basis of a predetermined confirmation condition when the first state is held by the state holding unit and, when it is determined that the appliance is subjected to the bridging processing, sets the state holding unit in the second state; and
   a bridging unit that subjects the appliance, which is determined to be subjected to the bridging processing, to the bridging processing.

2. The bridging device according to claim 1, further comprising:
   a second connection detecting unit that detects an appliance on the first network, wherein
   the arbitration unit determines that the bridging processing is performed when the arbitration unit confirms, as the predetermined confirmation condition, that another bridging device is not present on the first or the second network.

3. The bridging device according to claim 1, further comprising:
   a second connection detecting unit that detects an appliance on the first network, wherein
   the arbitration unit determines that the bridging processing is not performed when the arbitration unit confirms, as the predetermined confirmation condition, that another bridging device subjecting the detected appliance to the bridging processing is present on the first or the second network.

4. The bridging device according to claim 1, further comprising:
   a second connection detecting unit that detects an appliance on the first network, wherein
   when the first state is held by the state holding unit and the second connection detecting unit or the connection detecting unit detects that another bridging device performing a bridging processing is disconnected from the first or the second network, the arbitration unit determines, when the arbitration unit confirms that still another bridging device is not present on the first or the second network, that the bridging device takes over the bridging processing performed by the another bridging device, sets the state holding unit in the second state, and causes the bridging unit to start the bridging processing.

5. The bridging device according to claim 1, further comprising:
   a second connection detecting unit that detects an appliance on the first network, wherein
   when the first state is held by the state holding unit and the second connection detecting unit or the connection detecting unit detects that another bridging device performing a bridging processing is disconnected from the first or the second network, the arbitration unit determines, when the arbitration unit confirms that still another bridging device is present on the first or the second network, whether the bridging device takes over the bridging processing according to negotiation with the still another bridging device, sets the state holding unit in the second state when the arbitration unit determines that the bridging device takes over the bridging processing, and causes the bridging unit to start the bridging processing.

6. The bridging device according to claim 5, wherein the arbitration unit receives identifier data for identifying the another bridging device from the still another bridging device and determines whether the bridging device takes over the bridging processing on a basis of the identifier data received.

7. The bridging device according to claim 6, wherein the arbitration unit determines whether the bridging device takes over the bridging processing by comparing identifier data of the bridging device with the received identifier data.

8. The bridging device according to claim 1, wherein the arbitration unit determines that the bridging processing is not performed when the detected appliance is a bridging device.

9. The bridging device according to claim 1, wherein, when the arbitration unit detects that another bridging device is performing the bridging processing of the detected appliance, the arbitration unit sets the state holding unit in the first state and causes the bridging unit to stop the bridging processing when the second state is held by the state holding unit.

10. The bridging device according to claim 1, further comprising a bridging function operating unit that starts or ends, on the basis of instruction data from an appliance on the first network, a bridging processing for an appliance on the second network designated by the instruction data.

11. The bridging device according to claim 1, wherein an appliance on the first network operates in accordance with an UPnP protocol and an appliance on the second network operates in accordance with an AV/C protocol or an ECHONET protocol.

12. A computer readable medium storing a communication program that causes a bridging device which is connected to a first network and a second network and realizes communication between an appliance connected to the first network and an appliance connected to the second network, to execute the steps of:
   detecting an appliance on the second network;
   detecting whether the bridging device is in a first state or a second state;
   determining that the detected appliance is subjected to bridging processing when the bridging device is in the second state;
   determining whether the detected appliance is subjected to the bridging processing on a basis of a predetermined confirmation condition when the bridging device is in the first state, and setting the bridging device in the second state when it is determined that the detected appliance is subjected to the bridging processing; and
   subjecting the appliance, which is determined to be subjected to the bridging processing, to the bridging processing.

13. A communication method executed in a bridging device that is connected to a first network and a second network and realizes communication between an appliance connected to the first network and an appliance connected to the second network, the communication method comprising:
   detecting an appliance on the second network;

detecting whether the bridging device is in a first state or a second state;

determining that the detected appliance is subjected to bridging processing when the bridging device is in the second state;

determining whether the detected appliance is subjected to the bridging processing on a basis of a predetermined confirmation condition when the bridging device is in the first state, and setting the bridging device in the second state when it is determined that the detected appliance is subjected to the bridging processing; and subjecting the appliance, which is determined to be subjected to the bridging processing, to the bridging processing.

* * * * *